No. 865,840.
PATENTED SEPT. 10, 1907.
H. S. WILCOX.
FRINGE BRUSHING MACHINE.
APPLICATION FILED DEC. 4, 1905.
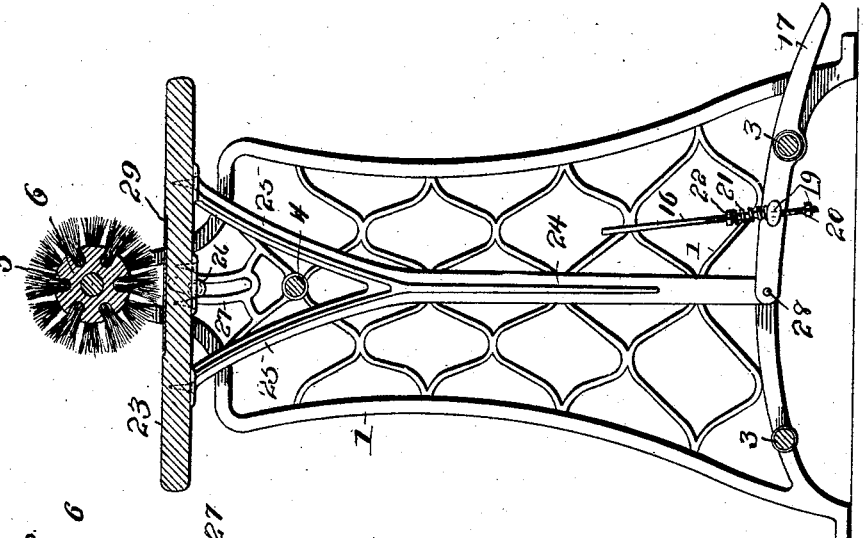
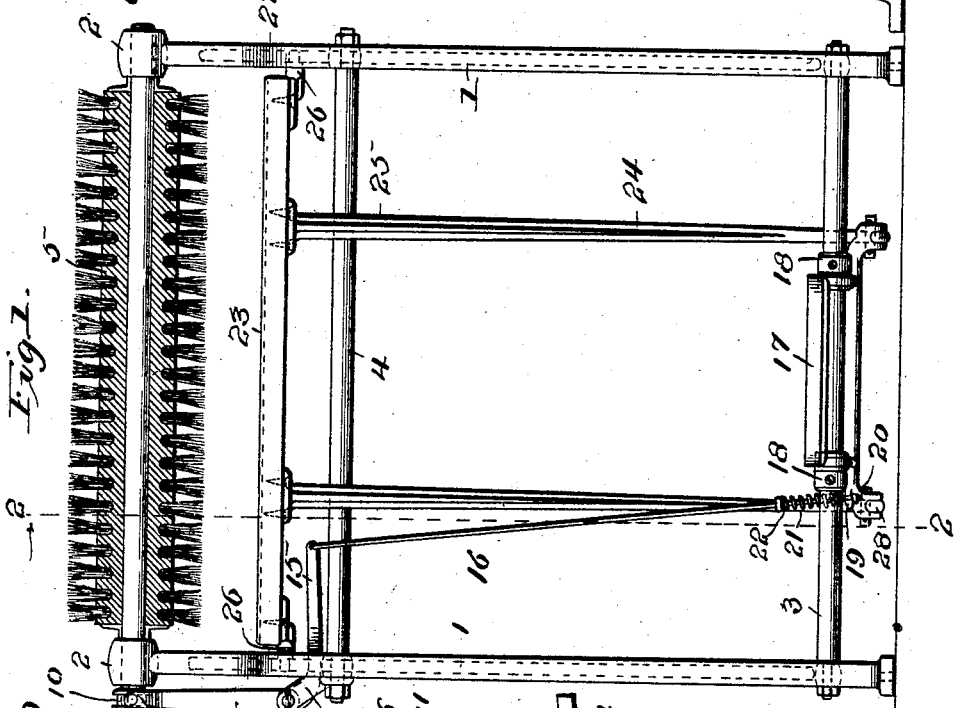
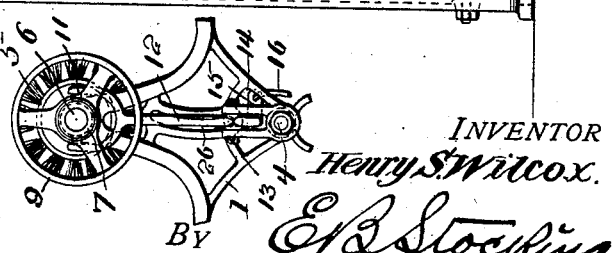
INVENTOR
Henry S. Wilcox.
BY
Attorney

UNITED STATES PATENT OFFICE.

HENRY S. WILCOX, OF CHICAGO, ILLINOIS, ASSIGNOR TO TROY LAUNDRY MACHINERY COMPANY, LIMITED, OF TROY, NEW YORK, A CORPORATION OF NEW YORK.

FRINGE-BRUSHING MACHINE.

No. 865,840.         Specification of Letters Patent.         Patented Sept. 10, 1907.

Application filed December 4, 1906. Serial No. 290,214.

*To all whom it may concern:*

Be it known that I, HENRY S. WILCOX, a citizen of the United States, residing at Chicago, in the county of Cook, State of Illinois, have invented certain new and useful Improvements in Fringe-Brushing Machines, of which the following is a specification, reference being had therein to the accompanying drawing.

This invention relates to a fringe brushing machine and is particularly adapted for use in laundry work where it is desirable to brush or straighten the fringe upon towels, napkins and other articles.

The invention has for an object to produce a novel and efficient construction of parts in which a work table is mounted for movement toward and from a rotary brush, and during said movement the clutch controlling the rotation of said brush is automatically operated.

A further object of the invention is to provide novel and improved means for mounting the work table by which the lateral travel of the operating treadle connected therewith is counteracted so as to maintain the table in proper relation with the brush for securing the most efficient operation.

Other and further objects and advantages of the invention will be hereinafter set forth and the novel features thereof defined by the appended claims.

In the drawing:—Figure 1 is a front elevation of the machine with the brush in section and the work table lowered; Fig. 2 is a section on line 2—2, Fig. 1, and Fig. 3 is a detail end elevation of the clutch mechanism.

Like numerals of reference indicate like parts throughout the several views of the drawings.

The machine may be mounted in any suitable frame work, for instance, the opposite end frames 1, each provided at their upper portion with bearing boxes 2 and connected together at their base by the tie rods 3. If desired an intermediate rod 4 may be extended between the frames. In the bearing boxes 2, the rotary brush 5 is mounted by means of the shaft 6 extending therefrom, said shaft being provided with any desired form of clutch mechanism, one instance of which is shown in Fig. 1, composed of a clutch member 7 secured to the shaft 6, and adapted to coöperate with the clutch face 8 carried by the hub of the driving pulley 9 which is loosely mounted upon the shaft 6. At the opposite side of the pulley 9, the hub thereof is provided with the circumferential groove 10 into which the yoke 11 of the shifting lever 12 extends so as to permit a free rotation of the hub while the same is being shifted upon its shaft. This shifting lever 12 is pivotally mounted at 13 upon a bracket 14 of the frame, while the angle arm 15 of the lever is connected by means of a rod 16 with the treadle 17 rotatably mounted upon one of the tie rods 3 at the base of the machine. This treadle is held against lateral movement upon the rod by means of the collars 18 secured upon the rod as shown in Fig. 1. The rod 16 is threaded at its lower end and projects through a lug 19 carried by the treadle, while the lower end of the rod is provided with the stop nut 20. Above the lug 19 a spring 21 surrounds the rod, and the tension thereof may be adjusted by means of a nut 22 threaded upon the rod. The tendency of the spring is to force the rod upward and throw the driving pulley into clutching position.

The work table 23 is provided with one or more standards 24 which are bifurcated at their upper ends 25 so as to extend at opposite sides of the center of the table to secure an extended bearing at each side of the brush, while the table is held against extended lateral movement at its upper end by means of pins or lugs 26 extending therefrom into the curved slots 27 provided at the upper portion of the frame 1. The lower ends of the standards 24 are pivotally connected at 28 with the inner end of the treadle 17. These curved guide slots are for the purpose of counteracting the tilting movement produced in the table by reason of the connection of its standards with the treadle at its lower end. The movement of the inner end of the treadle is upon an arc, which movement, if not counteracted would tilt the table upon the projections 26 as a pivot, but the curved guide slots produce a lateral movement of these projections sufficient to counteract this tilting tendency and cause the table to approach the brush in proper position. For the purpose of preventing excessive wear upon the surface of the table by the brush, a metallic plate 29 is secured thereto.

In the operation of the machine, the towel or other article of which the fringe is to be brushed is spread upon the table, and the rotary movement of the brush produces a feed across the table and also straightens the fringed ends or edges as well as removes any of the fringed portion which may be adhering to the surface of the body of the article. This is a very important advantage in laundry work as in fringed articles the fringe is usually matted and disarranged so as to require a vigorous brushing or combing for the purpose of straightening the same and producing the most efficient effect in the laundered article. While the invention has been described for use in connection with laundry work, it is, of course, capable of equally efficient operation in any case where it is desired to straighten the fringe or threads of an article by its passage beneath a brushing member. The laterally disposed guide slots cause the table to have a movement transversely of the brush axis in its travel toward the same and this is important in order that the brush engage the goods at the rear of the fringed edge so as to first brush the fringe which adheres to the body of the article outward therefrom, and as the article is withdrawn this brushing continues over the fringed portion. When the table is lowered its movement toward the operator permits the article to be placed in position with the fringe extended beyond the center of the table and during its rising movement the table travels toward the rear of the machine and away from the operator for the purposes described.

Having now described my invention and set forth its merits, what I claim and desire to secure by Letters Patent is:—

1. In a fringe brushing machine, a frame, a rotary brush mounted therein, a table disposed beneath said brush, means for reciprocating said table toward and from said brush, and a connection between the table and frame for effecting a lateral movement of the table toward the rear of the machine and transversely to the brush axis during said travel toward the brush.

2. In a fringe brushing machine, a rotary brush, a frame for supporting said brush provided with guide slots extended upward and laterally of the vertical plane of the axis of said brush and beneath the same, a table disposed beneath the brush and provided with means extended into said slots, a standard extended from said table, and means for moving said standard and table toward and from said brush.

3. In a fringe brushing machine, opposite frames, having at their upper portion bearing boxes, a rotary brush mounted in said boxes, a table disposed beneath said brush and provided with projections extending into curved guide slots in said frames, a depending standard from said table, a treadle pivotally mounted at the lower portion of said frames and pivotally connected to said standards.

4. In a fringe brushing machine, a rotary brush, a table mounted for movement relative thereto, a clutch member carried by the shaft of said brush, a coöperating clutch slidingly mounted upon said shaft, a bell crank lever connected at one end to said sliding clutch member, an operating treadle for said table, a connecting rod extending from the bell crank lever through a portion of said treadle, a projection secured to said rod above said treadle, and a spring disposed between said projection and the portion of the treadle through which said rod passes.

In testimony whereof, I affix my signature in presence of two witnesses.

HENRY S. WILCOX.

Witnesses:
J. WEBB GRIFFEN,
WM. KROGMAN.